(12) United States Patent
Oikawa

(10) Patent No.: US 8,877,360 B2
(45) Date of Patent: Nov. 4, 2014

(54) MAGNETIC RECORDING MEDIUM WITH A PLURALITY OF PINNING PORTIONS IN THE MAGNETIC LAYER

(75) Inventor: Soichi Oikawa, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 189 days.

(21) Appl. No.: 13/303,479

(22) Filed: Nov. 23, 2011

(65) Prior Publication Data

US 2012/0263975 A1   Oct. 18, 2012

(30) Foreign Application Priority Data

Apr. 15, 2011   (JP) .................................. 2011-091446

(51) Int. Cl.
| G11B 5/673 | (2006.01) |
| G11B 5/73 | (2006.01) |
| G11B 5/65 | (2006.01) |
| G11B 5/66 | (2006.01) |

(52) U.S. Cl.
CPC ............... *G11B 5/65* (2013.01); *G11B 5/7325* (2013.01); *G11B 5/66* (2013.01)
USPC ...................... 428/828.1; 428/836.1; 360/135

(58) Field of Classification Search
None
See application file for complete search history.

(56) References Cited

U.S. PATENT DOCUMENTS

| 8,076,013 | B2 * | 12/2011 | Sonobe et al. ................. 428/827 |
| 8,475,949 | B2 * | 7/2013 | Kimura et al. ............. 428/836.2 |
| 8,481,181 | B2 * | 7/2013 | Wang et al. .................... 428/812 |
| 2003/0235717 | A1 * | 12/2003 | van de Veerdonk et al. ...................... 428/694 TM |
| 2004/0110034 | A1 * | 6/2004 | Kawada ..................... 428/694 R |
| 2004/0146747 | A1 * | 7/2004 | Nemoto et al. ............. 428/694 T |
| 2007/0281078 | A1 * | 12/2007 | Kikitsu et al. ................. 427/127 |
| 2008/0292907 | A1 * | 11/2008 | Berger et al. .................. 428/828 |
| 2009/0162702 | A1 * | 6/2009 | Sun et al. ....................... 428/831 |
| 2012/0251845 | A1 * | 10/2012 | Wang et al. .................... 428/827 |

FOREIGN PATENT DOCUMENTS

| JP | 2000-195036 | 7/2000 |
| JP | 2002236815 A | 8/2002 |
| JP | 2004-227701 | 8/2004 |
| JP | 2004-342155 | 12/2004 |
| JP | 2006252760 A | 9/2006 |
| JP | 2008226394 A | 9/2008 |
| JP | 2009157964 A | 7/2009 |

OTHER PUBLICATIONS

Rahman, M., Lai, C., Vokoun, D., and Shams, N., IEEE Trans. Mag., 43(6), 2133-2135, 2007.*
Dieter Suess, et al., "Micromagnetic study of pinning behavior in percolated media", Journal of Applied Physics 99, 08G905 (2006) (3 pages).

(Continued)

*Primary Examiner* — Kevin Bernatz
(74) *Attorney, Agent, or Firm* — Patterson & Sheridan, LLP

(57) ABSTRACT

According to one embodiment, a perpendicular magnetic recording medium includes a substrate, and a multilayered magnetic recording layer formed on the substrate by alternately stacking two or more magnetic layers and two or more nonmagnetic layers. The magnetic layers and nonmagnetic layers of the multilayered magnetic recording layer are continuous layers. The magnetic layer includes a magnetic material portion, and a plurality of pinning sites dispersed in the magnetic material portion and made of a nonmagnetic metal different from a nonmagnetic material as a main component of the nonmagnetic layer. This perpendicular magnetic recording medium has magnetic characteristics by which a gradient α of a magnetization curve near the coercive force is 5 or more.

16 Claims, 10 Drawing Sheets
(2 of 10 Drawing Sheet(s) Filed in Color)

(56) References Cited

OTHER PUBLICATIONS

M. Tofizur Rahman, et al., "Magnetic multilayers on porous anodized alumina for percolated perpendicular media", Applied Physics Letters 91, 132505 (2007) (3 pages).

Jian-Gang Zhu, et al., "Micromagnetics of Percolated Perpendicular Media," IEEE Transactions on Magnetics vol. 43, No. 2, Feb. 2007, pp. 687-692.

David E. Laughlin, et al., "Fabrication, Microstructure, Magnetic, and Recording Properties of Percolated Perpendicular Media", IEEE Transactions on Magnetics, vol. 43, No. 2, Feb. 2007, pp. 693-697.

Japanese Office Action dated Jun. 26, 2012, filed in Japanese counterpart Application No. 2011-091446, 5 pages.

* cited by examiner

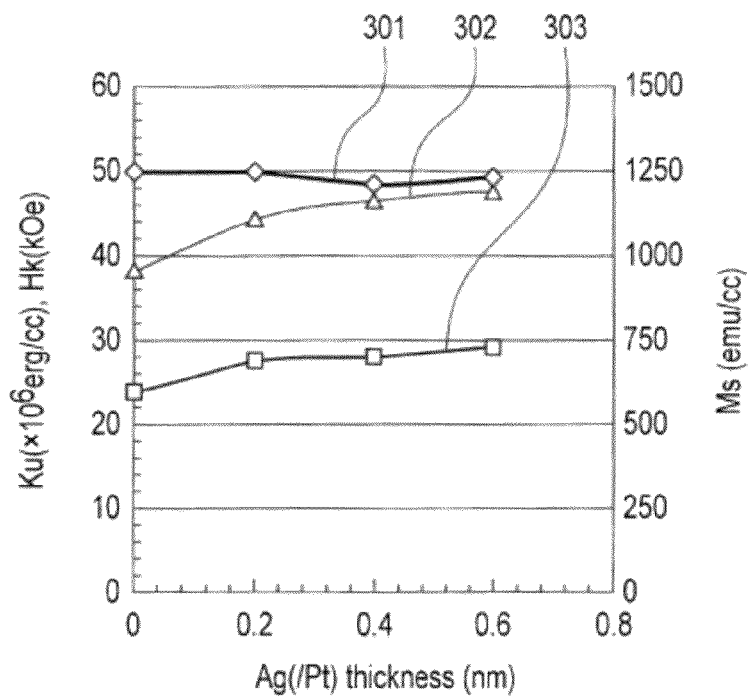
F I G. 8
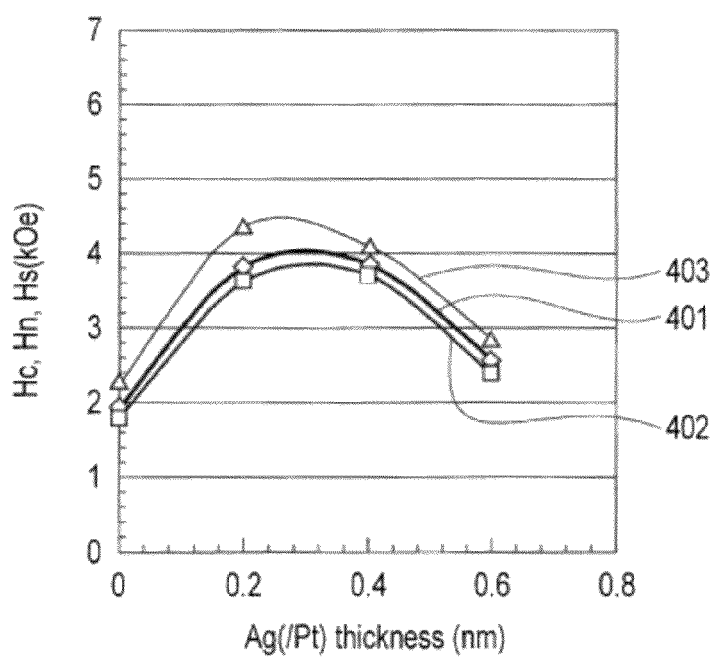
F I G. 9

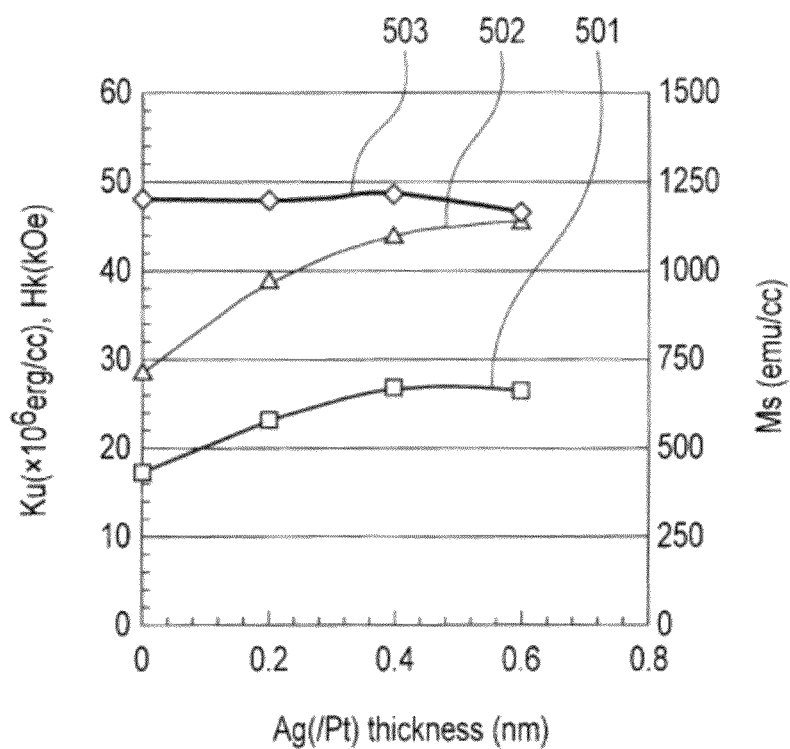
F I G. 10
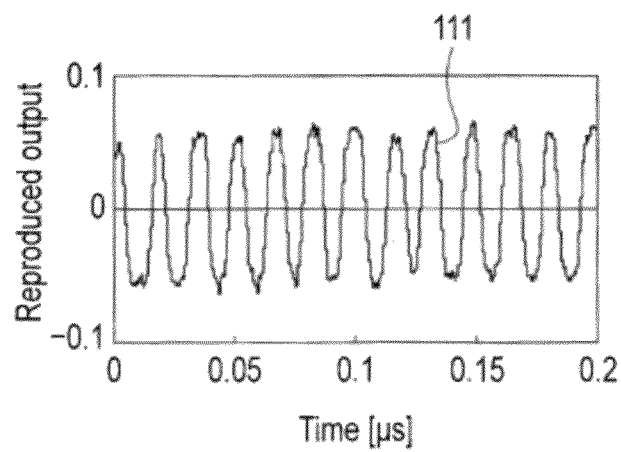
F I G. 11

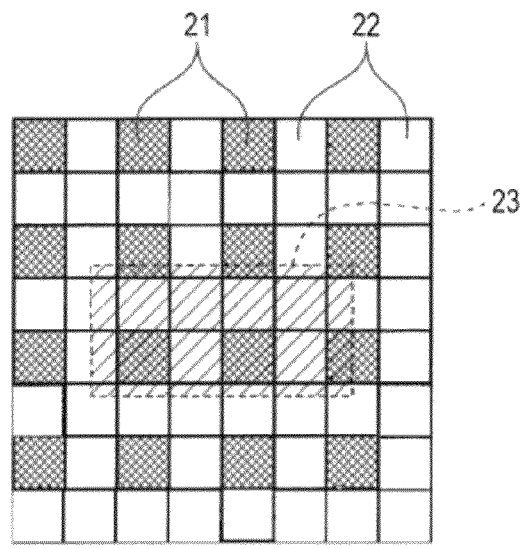
F I G. 17
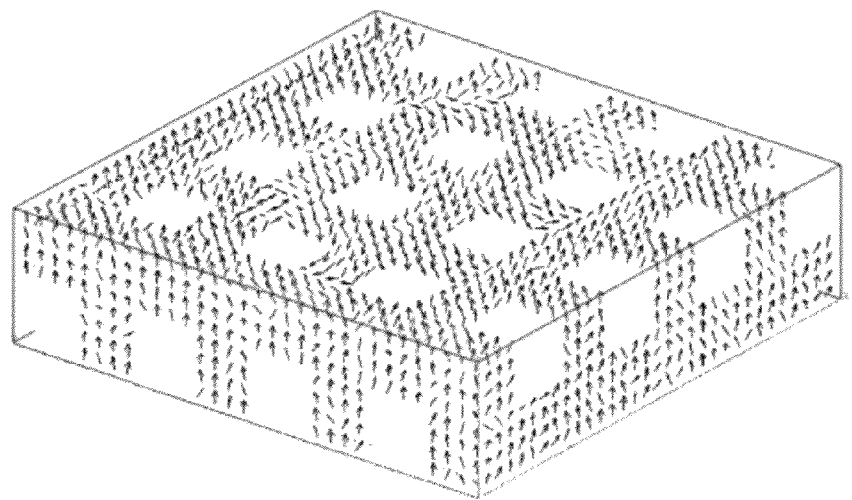
F I G. 20

MAGNETIC RECORDING MEDIUM WITH A PLURALITY OF PINNING PORTIONS IN THE MAGNETIC LAYER

CROSS-REFERENCE TO RELATED APPLICATIONS

This application is based upon and claims the benefit of priority from prior Japanese Patent Application No. 2011-091446, filed Apr. 15, 2011, the entire contents of which are incorporated herein by reference.

FIELD

Embodiments described herein relate generally to a magnetic recording medium.

BACKGROUND

A CoCrPt-oxide granular type magnetic recording layer is presently used in a medium of an HDD, and CoCrPt magnetic grains must be downsized in order to increase the areal recording density. If the magnetic grains are downsized, however, the thermal stability decreases, and data easily disappears. The thermal stability can be increased by increasing the perpendicular magnetic anisotropy, but the coercive force in high-speed magnetization reversal also increases. If the coercive force becomes higher than the recording magnetic field of a head, it is no longer possible to perform satisfactory recording.

Although a BPM (Bit Patterned Medium) has been examined as a solution, the flatness of the medium surface worsens when patterning a magnetic recording layer, and this causes easy contact between a head and the medium. Accordingly, a medium having an unpatterned surface is favorable. Also, the servo and data bit positions of the BPM are determined when patterning the medium, but it is desirable to be able to freely set these positions after the medium is completed.

From the foregoing, a medium called a PPM (Percolated Perpendicular Medium) has been proposed. In the PPM, bits are maintained by pinning the domain walls by forming pores or nonmagnetic pinning sites in a domain wall motion type magnetic layer. The thermal stability is high because one bit surrounded by the domain walls is the unit of thermal decay, and domain wall motion decreases the coercive force, so easy recording can be expected. Experimentally, however, a CoPt-oxide-based PPM, for example, has the problem of an insufficient perpendicular magnetic anisotropy and the problem of heating, and a Co/Pt-pore type PPM, for example, has the problem of surface flatness because a substrate is processed.

BRIEF DESCRIPTION OF THE DRAWINGS

The patent or application file contains at least one drawing executed in color. Copies of this patent or patent application publication with color drawing(s) will be provided by the Office upon request and payment of the necessary fee. A general architecture that implements the various features of the embodiments will now be described with reference to the drawings. The drawings and the associated descriptions are provided to illustrate the embodiments and not to limit the scope of the invention.

FIG. 8 is a graph showing the relationship between the Ag layer thickness and Ku, Hk, and Ms of the example of the perpendicular magnetic recording medium according to the embodiment;

FIG. 9 is a graph showing the relationship between the Ag layer thickness and Hc, Hn, and Hs of another example of the perpendicular magnetic recording medium according to the embodiment;

FIG. 10 is a graph showing the relationship between the Ag layer thickness and Ku, Hk, and Ms of the other example of the perpendicular magnetic recording medium according to the embodiment;

FIG. 11 is a graph showing the reproduced waveform of an example of the perpendicular magnetic recording medium according to the embodiment;

FIG. 17 is a plan view showing a micromagnetics simulation calculation model of an example of the perpendicular magnetic recording medium according to the embodiment;

FIG. 20 is a perspective view showing a micromagnetics simulation calculation model of an example of a perpendicular magnetic recording medium according to the second embodiment;

DETAILED DESCRIPTION

Figure 1:
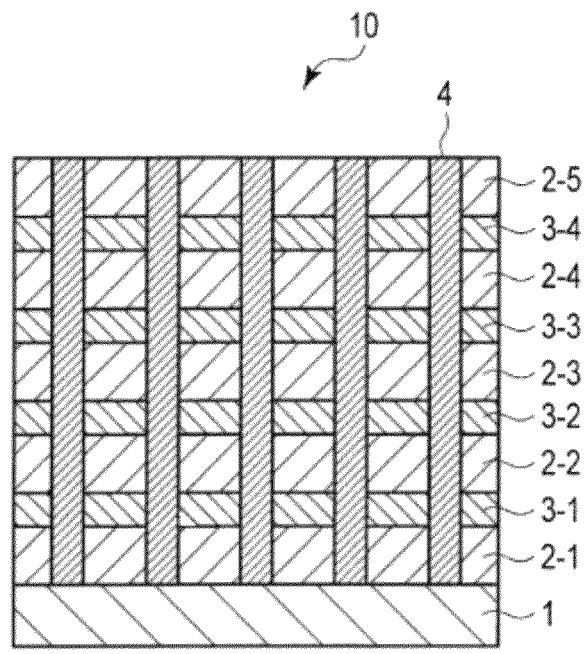
FIG. 1 is an exemplary sectional view showing an example of a perpendicular magnetic recording medium according to the first embodiment.

Various embodiments will be described hereinafter with reference to the accompanying drawings.

In general, according to one embodiment, a perpendicular magnetic recording medium including a substrate, and a multilayered magnetic recording layer formed on the substrate by alternately stacking two or more magnetic layers and two or more nonmagnetic layers is provided.

The magnetic layers and nonmagnetic layers of the multilayered magnetic recording layer are continuous layers. Each magnetic layer includes a magnetic material portion, and a plurality of pinning sites dispersed in the magnetic material portion and made of a nonmagnetic metal different from a nonmagnetic material as a main component of the nonmagnetic layers. This perpendicular magnetic recording medium has magnetic characteristics by which a gradient $\alpha$ of a magnetization curve near the coercive force is 5 or more.

Note that the main component herein mentioned is a component such as an element or compound having the largest content in a material forming an object.

The embodiment also provides a magnetic recording/reproduction apparatus including the above-mentioned perpendicular magnetic recording medium and a magnetic head.

The embodiment uses the multilayered film including pinning sites in the magnetic recording layer of the perpendicular magnetic recording medium. This makes it possible to achieve both a high thermal stability and high recording easiness, and obtain a high areal recording density.

In the perpendicular magnetic recording medium according to the embodiment, pinning sites insoluble in a magnetic metal can be embedded in a base superlattice capable of obtaining a high perpendicular magnetic anisotropy. When an oxide is used as the pinning sites, the oxide readily segregates in the grain boundary in the obtained structure. In the perpendicular magnetic recording medium according to the embodiment, therefore, a metal is used as the pinning sites insoluble in a magnetic metal. This presumably facilitates forming fine granular pinning sites having a high crystallinity.

<Substrate>

As the substrate, it is possible to use, e.g., a glass substrate, an Al-based alloy substrate, a ceramic substrate, a carbon substrate, or an Si single-crystal substrate having an oxidized surface.

Examples of the glass substrate are amorphous glass and crystallized glass. As the amorphous glass, it is possible to use, e.g., general-purpose soda lime glass or alumino silicate glass. As the crystallized glass, lithium-based crystallized glass or the like can be used. As the ceramic substrate, it is possible to use, e.g., a general-purpose sintered product mainly containing aluminum oxide, aluminum nitride, or silicon nitride, or a fiber reinforced product of any of these sintered products.

As the substrate, it is also possible to use a substrate obtained by forming an NiP layer on the surface of any of the above-mentioned metal substrates and non-metal substrates by using plating or sputtering.

Although only sputtering is described as the method of forming a thin film on the substrate, the same effect can be obtained by using, e.g., vacuum deposition or electroplating.

<Soft Magnetic Backing Layer>

In the embodiment, a so-called perpendicular double-layered medium can be manufactured by forming a high-permeability soft magnetic backing layer between the substrate and perpendicular magnetic recording layer. In this perpendicular double-layered medium, the soft magnetic backing layer horizontally passes a recording magnetic field from a magnetic head, e.g., a single-pole head for magnetizing the perpendicular magnetic recording layer, and returns the magnetic field toward the magnetic head, i.e., performs a part of the function of the magnetic head. The soft magnetic backing layer can achieve a function of applying a steep sufficient perpendicular magnetic field to the magnetic recording layer, thereby increasing the recording/reproduction efficiency.

Materials containing, e.g., Fe, Ni, and Co can be used as the soft magnetic backing layer.

Examples of the materials are FeCo-based alloys such as FeCo and FeCoV, FeNi-based alloys such as FeNi, FeNiMo, FeNiCr, and FeNiSi, FeAl-based alloys, FeSi-based alloys such as FeAl, FeAlSi, FeAlSiCr, FeAlSiTiRu, and FeAlO, FeTa-based alloys such as FeTa, FeTaC, and FeTaN, and FeZr-based alloys such as FeZrN.

It is also possible to use a material having a microcrystalline structure or a granular structure in which fine crystal grains are dispersed in a matrix. Examples are FeAlO, FeMgO, FeTaN, and FeZrN containing 60 at % or more of Fe.

As another material of the soft magnetic backing layer, it is possible to use a Co alloy containing Co and at least one of Zr, Hf, Nb, Ta, Ti, and Y. The content of Co can be 80 at % or more. When the Co alloy like this is deposited by sputtering, an amorphous layer readily forms. The amorphous soft magnetic material has none of magnetocrystalline anisotropy, a crystal defect, and a grain boundary, and hence has a very high soft magnetism.

An example of the amorphous soft magnetic material as described above is an alloy containing cobalt as a major component and zirconium as a minor component, e.g., a CoZr-based alloy such as CoZr, CoZrNb, or CoZrTa. B can further be added to any of the above-described materials in order to, e.g., facilitate the formation of the amorphous layer.

When the amorphous material is used as the soft magnetic backing layer, the layer exerts almost no direct influence on the crystal orientation of a metal layer formed on it, like an amorphous-based substrate. Even when the material is changed, therefore, the structure and crystallinity of the magnetic recording layer do not greatly change, so basically the same magnetic characteristics and recording/reproduction characteristics can be expected. When the third element is the only difference such as in the CoZr-based alloy, the differences in saturation magnetization (Ms), coercive force (Hc), and permeability ($\mu$) are also low. This makes it possible to obtain almost equal magnetic characteristics and magnetic recording/reproduction characteristics.

<Nonmagnetic Underlayer>

In the perpendicular magnetic recording medium of the present invention, a nonmagnetic underlayer can be formed between the substrate or the soft magnetic backing layer formed on the substrate, and the perpendicular magnetic recording layer.

As the nonmagnetic underlayer, it is possible to use, e.g., Ru or Ti. Ru or Ti has the same close-packed crystal structure as that of Co as the main component of the recording layer, Pt, or Pd. Ru and Ti can be used in that the lattice mismatch is not too large, and a small grain size facilitates columnar growth.

Also, when the Ar gas pressure is raised during deposition, it is possible to further decrease the grain size, improve the grain size dispersion, and promote disconnection between the grains. Although the crystal orientation often worsens in this case, that can be compensated for by combining, as needed, a low-gas-pressure nonmagnetic underlayer that readily improves the crystal orientation. The first half can be performed at a low gas pressure, and the second half can be performed at a high gas pressure. The same effect can be expected when the gas pressure in the second half is relatively higher than that in the first half. The gas pressure in the second half may also be 10 Pa or more. The layer thickness ratio can be such that the low-gas-pressure layer is made thicker when giving priority to the crystal orientation, and the high-gas-pressure layer is made thicker when giving priority to, e.g., the downsizing of grains.

Disconnection between the grains can further be promoted by adding an oxide. The oxide can be particularly at least one oxide selected from the group consisting of silicon oxide, chromium oxide, and titanium oxide.

Note that even when an fcc metal is used as the nonmagnetic underlayer, hcp (00.1) orientation can be given to the Co-based recording layer by (111) orientation. This makes it possible to use, e.g., Rh, Pd, or Pt. It is also possible to use an alloy containing at least one element selected from the group consisting of Ru, Rh, Pd, and Pt, and at least one element selected from the group consisting of Co and Cr. Furthermore, it is possible to add at least one element selected from the group consisting of, e.g., B, Ta, Mo, Nb, Hf, Ir, Cu, Nd, Zr, W, and Nd.

Note also that in this perpendicular magnetic recording medium, the crystal grain size and crystal orientation of the magnetic recording layer can be improved by stacking a plurality of nonmagnetic underlayers. When the magnetic underlayer can be thinned by these improvements, the recording/reproduction characteristics can be improved by shortening the distance (spacing) between a magnetic head and the soft magnetic backing layer. A nonmagnetic underlayer close to the soft magnetic backing layer also functions as a backing layer when soft magnetic characteristics can be given to this nonmagnetic underlayer. The distance to a magnetic head can further be shortened.

As the material of the nonmagnetic underlayer of the present invention, an hcp or fcc metal has the advantage that it is readily possible to improve the crystal orientation. However, a bcc metal can be used in an underlayer not in contact with the perpendicular magnetic recording layer. In this case, the effect of decreasing the crystal grain size in the underlayer by the difference between the crystal structures can be expected. Although it is not essential to stack a plurality of materials, when stacking layers, at least one material selected from the group consisting of, e.g., Ru, Pd, Pt, Ni, Ta, Ti, Al, and alloys of these metals can be used. To further improve the characteristics, it is possible to mix these materials, mix another element, or stack the materials.

A nonmagnetic underlayer mainly containing at least one metal selected from the group consisting of Ti, Pt, and Al can also be formed in contact with the multilayered magnetic recording layer. The multilayered magnetic recording layer includes pinning sites, and the size, dispersion, location, density, and the like of these pinning sites are probably affected by an underlayer immediately below that. When a metal mainly containing at least one element selected from the group consisting of Cu, Ag, and Au is used as the pinning sites, pinning sites are formed with an appropriate distribution by forming the nonmagnetic underlayer as described above. As a consequence, a perpendicular magnetic recording medium having a good pinning effect is often obtained.

The thickness of the nonmagnetic underlayer can be 0.1 to 50 nm, and further 4 to 30 nm. Generally, an underlayer is desirably thick because the crystallinity readily improves regardless of whether Ru is used. However, even in an island-like structure in which the average layer thickness is one atomic layer or less, the effects of decreasing the crystal grain size and improving the crystal orientation can be expected in some cases. When the nonmagnetic underlayer is a soft magnetic material having good characteristics, a maximum value is no longer limited from the viewpoint of the spacing. If the thickness is excessively increased when the material has no magnetism, however, the increase in spacing deteriorates the recording capability or recording resolution of a magnetic head.

<Perpendicular Magnetic Recording Layer>

FIG. 1 is an exemplary sectional view showing an example of the perpendicular magnetic recording medium according to the embodiment.

Figure 2:
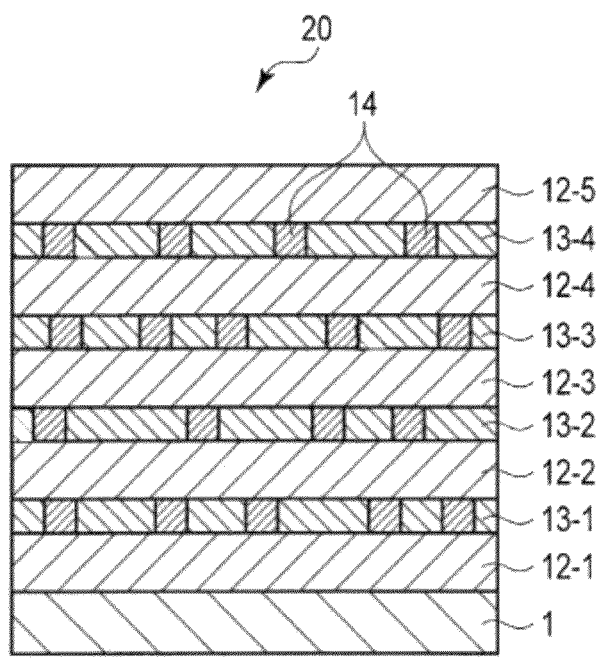
FIG. 2 is an exemplary sectional view showing another example of the perpendicular magnetic recording medium according to the first embodiment.

FIG. 2 is an exemplary sectional view showing another example of the perpendicular magnetic recording medium according to the embodiment.

Figure 3:
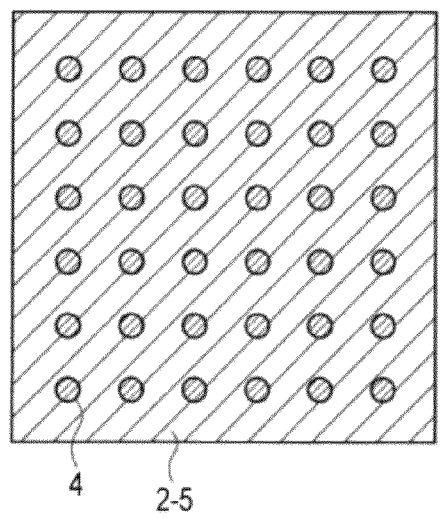
FIG. 3 is an exemplary plan view showing the structure of a multilayered perpendicular magnetic recording layer shown in FIG. 1.

FIG. 3 is an exemplary plan view showing the structure of a multilayered perpendicular magnetic recording layer shown in FIG. 1.

As shown in FIG. 1, a perpendicular magnetic recording medium 10 according to an embodiment has a multilayered structure in which nonmagnetic layers 2-1, 2-2, 2-3, 2-4, and 2-5 and magnetic layers 3-1, 3-2, 3-3, and 3-4 are alternately stacked on a substrate 1. The magnetic layers 3-1, 3-2, 3-3, and 3-4 include a plurality of pinning sites dispersed in a magnetic material portion and made of a nonmagnetic metal different from a nonmagnetic material as the main component of the nonmagnetic layers. Also, the nonmagnetic layers 2-1, 2-2, 2-3, 2-4, and 2-5 include a plurality of pinning sites dispersed in a nonmagnetic material portion and made of a nonmagnetic metal different from the nonmagnetic material. The pinning sites in the nonmagnetic layers are connected to the pinning sites in adjacent magnetic layers, thereby forming columnar pinning sites 4. Note that the columnar pinning sites extend through the multilayered magnetic recording layer perpendicularly to the film surface in the exemplary view of FIG. 1, but the pinning sites may also be bent or discontinuous.

As shown in FIG. 2, a perpendicular magnetic recording medium 20 according to another embodiment has a multilayered structure in which nonmagnetic layers 12-1, 12-2, 12-3, 12-4, and 12-5 and magnetic layers 13-1, 13-2, 13-3, and 13-4 are alternately stacked on a substrate 1. The magnetic layers 13-1, 13-2, 13-3, and 13-4 include a plurality of pinning sites 14 dispersed in a magnetic material portion and made of a nonmagnetic metal different from a nonmagnetic material as the main component of the nonmagnetic layers. The pinning site 14 are scattered in the film surfaces of the magnetic layers 13-1, 13-2, 13-3, and 13-4.

In a medium in which magnetic layers magnetically strongly couple with each other in the film surfaces and magnetization reversal is performed by domain wall motion, nonmagnetic regions as described above function as pinning sites that suppress the motion of the domain walls. Although the pinning sites can be regularly arrayed as shown in FIG. 3, a regular array is difficult to form by a normal sputtering process. Therefore, an irregular array as shown in FIG. 2 may also be formed.

Note that no pinning tends to occur if the domain wall thickness is larger than the diameter of a pinning site. Since the same result is obtained by calculations performed by micromagnetics simulation, the domain wall thickness must be made smaller than the pinning site diameter.

When the areal recording density is about 3 Tbits/inch$^2$, for example, the bit length in the head running direction is about 10 nm (although this also depends on the track width), so a necessary thickness of the domain wall as a transition region between bits is expectedly 5 nm or less.

The thickness δ of the domain wall is given by equation (1) below by using an exchange stiffness constant A and magnetic anisotropic constant K.

$$\delta = \pi \sqrt{(A/K)} \quad (1)$$

Therefore, to obtain a domain wall thickness of 5 nm when exchanging coupling is strong (A=1 μerg/cm), for example, K=4×10$^7$ erg/cc, i.e., a considerably high magnetic anisotropy is necessary. The required value of K can be decreased when the areal recording density is low or by decreasing A. In the present invention, however, K can be, e.g., 1×10$^7$ erg/cc or more.

The pinning site diameter depends on Ku (a uniaxial magnetocrystalline anisotropic constant; perpendicular magnetic anisotropy when the crystal axis is perpendicular to the film surface). When the pinning site diameter is large, however, the pinning energy increases, so the thermal stability can be increased. On the other hand, when the recording density increases, the size of a bit decreases, so the pinning site diameter needs to be decreased. For example, the pinning site diameter can be about 4 nm. Although the density of pinning sites depends on the pinning site diameter and the required areal recording density, the criterion is, e.g., 50% or less.

When a close packed plane of a crystalline structure is oriented in a Co/Pt,Pd-based superlattice, a high Ku of 1×10$^7$ erg/cc or more is normally obtained, so a high areal recording density can be obtained. Co can be used as the magnetic layer, and Pt or Pd can be used as the nonmagnetic layer. Co has higher corrosion resistance than Fe and rare-earth elements.

The material of the nonmagnetic pinning sites cannot be dissolved in the magnetic layers. When using a metal such as Co as the magnetic grains, an oxide is generally selected as a material that is easy to separate. However, an oxide readily segregates in the grain boundary as in the conventional granular type magnetic layer.

In the present invention, therefore, a metal insoluble in the magnetic layer is used as the pinning sites. This is so because the metal does not segregates in the grain boundary, and this facilitates forming circular granular pinning sites. Also, the crystallinity is high, and downsizing is perhaps readily advanced. Cu, Ag, and Au can be used when the magnetic layer is Co.

The perpendicular magnetic recording layer can contain, as minor components, one or more elements selected from B, C, N, O, Si, Cr, Fe, Ni, Nb, Mo, Ru, Rh, Ta, and W, in addition to a major component such as Co, Pd, Pt, Cu, Ag, or Au. The addition of the above-mentioned elements can promote downsizing of the magnetic crystal grains, or improve the crystallinity or orientation. This makes it possible to obtain recording/reproduction characteristics and thermal decay characteristics more suited to high-density recording.

The total content of the above-mentioned minor components is can be 8 at % or less. If the total content exceeds 8 at %, the crystallinity and orientation of the magnetic layer are disturbed. Consequently, it is often impossible to obtain recording/reproduction characteristics and thermal stability suited to high-density recording.

Ku generally increases as the thickness of the magnetic layer decreases. However, Ku tends to decrease if the magnetic layer is thinner than about one atomic layer. Therefore, the magnetic layer thickness can be 0.2 to 1 nm, and can be, e.g., 0.4 nm.

The thickness of the nonmagnetic layer can be optimized so as to obtain a high Ku. The nonmagnetic layer thickness depends on the material of the nonmagnetic underlayer and the like, in addition to the material used in the perpendicular magnetic recording layer. In a [Co/Pt] or [Co/Pd] multilayered film, however, the nonmagnetic layer thickness can be 0.2 to 2 nm, and further, 0.4 to 1.2 nm.

Note that in the multilayered magnetic recording layer, a high interface magnetic anisotropy is obtained by sufficiently sandwiching the magnetic layer between the nonmagnetic layers. Accordingly, the thickness of the magnetic layer can be equal to or smaller than that of the nonmagnetic layer.

The thicknesses of the magnetic layers or nonmagnetic layers need not be the same from the first layer to the uppermost layer. An anisotropic magnetic field Hk (=2 Ku/Ms) can appropriately be controlled by changing Ku or Ms in the thickness direction by adjusting the individual thicknesses. When recording data by using a magnetic head, for example, the recording magnetic field is large in that portion of the perpendicular magnetic recording layer which is close to the head, and decreases in the direction away from the head. Accordingly, it is possible to set a high Hk in the upper portion of the recording layer, and a low Hk in the lower portion.

The number of layers in the multilayered magnetic recording layer can be 3 to 40, and further, 5 to 20. When the number falls within this range, the medium can operate as a magnetic recording/reproduction apparatus more suited to a high recording density. If the number of layers in the multilayered magnetic recording layer is less than 3, the number of magnetic layers is small, and the reproduced output becomes too low and often raises the ratio of system noise. If the number of layers in the multilayered magnetic recording layer exceeds 40, the reproduced output becomes too high and often distorts the waveform.

The coercive force Hc of the perpendicular magnetic recording layer can be 2 kOe or more. If the coercive force Hc is less than 2 kOe, pinning becomes insufficient, and a high areal recording density often becomes difficult to obtain.

The perpendicular squareness ratio of the perpendicular magnetic recording layer can be 0.9 or more. If the perpendicular squareness ratio is less than 0.9, a structure in which the crystal orientation has worsened or the thermal stability has partially decreased may be formed.

Assuming that a magnetic field at the intersection of the tangent of a magnetization curve near Hc and a negative saturation value is a nucleation magnetic field Hn, Hn is smaller than Hc, but Hn can be as large as possible from the viewpoints of, e.g., the reproduced output, the thermal decay resistance, and the information erase resistance when data is recorded on an adjacent track. However, increasing Hn is equivalent to increasing the gradient α of the magnetization curve near Hc. Unfortunately, in the conventional granular type perpendicular magnetic recording medium, the signal-to-noise ratio often decreases if α is increased.

The gradient α of the magnetization curve near the coercive force Hc is generally represented by $$\alpha = dM/dH|_{H=Hc} \quad (2)$$

In the embodiment, the gradient α is defined as indicated by equation (3) below by using Ms (emu/cc), Hc, and Hn (Oe) in the CGS system of units.

$$\alpha = 4\pi Ms/(Hc-Hn) \quad (3)$$

When a magnetic recording layer has a multilayered structure in which magnetic layers and nonmagnetic layers are alternately stacked, Ms is often calculated by using the volume of only the magnetic layers. In the present invention, however, the values of Ms and α are basically represented by using the volume of the whole multilayered magnetic recording layer including the nonmagnetic layers, by taking account of comparison with a single magnetic layer such as a granular layer.

The gradient α of the magnetization curve near Hc of the perpendicular magnetic recording layer is almost 1 when exchange coupling between the magnetic grains is much smaller than magnetostatic coupling. When the exchange coupling becomes strong, (Hc−Hn) becomes small, and α becomes larger than 1. In the granular type perpendicular magnetic recording medium presently put to practical use, good recording/reproduction characteristics are obtained as a whole when the intergranular coupling is more or less strengthened, so α is about 2. Basically, however, a high linear recording density and high signal-to-noise ratio are often obtained when the intergranular coupling is weak. Therefore, an intergranular coupling with tends to be too strong when α becomes larger than 3 in the granular type perpendicular magnetic recording medium. If α is 5 or more, each magnetic grain does not independently reverse magnetization but reverses magnetization under the influence of the reversal of an adjacent grain.

In a soft magnetic material well known for domain wall motion type magnetization reversal, α is as large as 1,000 to 10,000 because the values of Hc and Hn are small. A hard magnetic material used in the magnetic recording layer has a high magnetic anisotropy and hence readily causes magnetization rotation, and a transition region equivalent to the domain wall is very thin. Accordingly, the expression "domain wall motion type" may be inappropriate even when α is large. When α is 5 or more, however, the magnetization reversal progressing process is presumably almost the same as that of the domain wall motion type magnetization reversal.

The magnetic recording medium of the present invention is based on the domain wall motion type magnetization reversal, instead of the magnetization rotation type magnetization reversal of the conventional granular medium. Therefore, the gradient α of the magnetization curve near Hc can be 5 or more because a large Hn can be ensured.

<Protective Layer>

A protective layer can prevent the corrosion of the perpendicular magnetic recording layer, and can also prevent damages to the medium surface when a magnetic head comes in contact with the medium. Examples of the material of the protective layer are materials containing C, $SiO_2$, and $ZrO_2$.

The thickness of the protective layer can be 1 to 10 nm. This thickness is suitable for high-density recording because the distance between the head and medium can be decreased.

Also, a lubricating layer (not shown) can be formed on the protective layer.

As a lubricant for use in the lubricating layer, it is possible to use, e.g., perfluoropolyether, alcohol fluoride, or fluorinated carboxylic acid.

<Magnetic Recording/Reproduction Apparatus>

Figure 4:
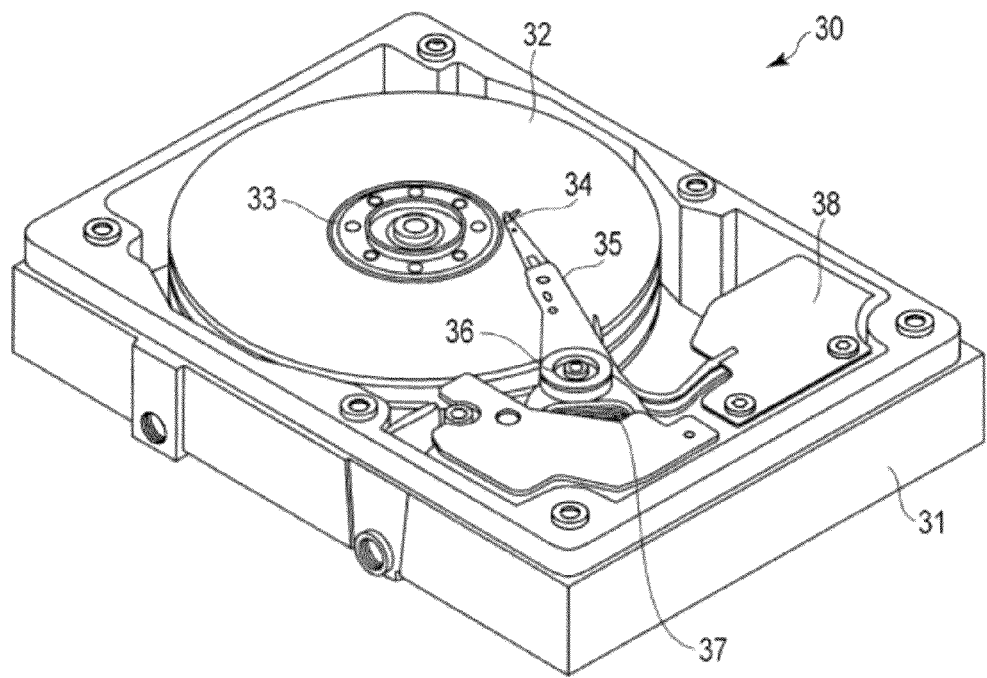
FIG. 4 is a partially exploded perspective view showing an example of a magnetic recording/reproduction apparatus according to the embodiment.

FIG. 4 is a partially exploded perspective view showing an example of the magnetic recording/reproduction apparatus according to the embodiment.

As shown in FIG. 4, a perpendicular magnetic recording apparatus 30 according to the embodiment includes a rectangular boxy housing 31 having an open upper end, and a top cover (not shown) that is screwed to the housing 31 by a plurality of screws and closes the upper-end opening of the housing.

The housing 31 accommodates, e.g., a perpendicular magnetic recording medium 32 according to the embodiment, a spindle motor 33 as a driving means for supporting and rotating the perpendicular magnetic recording medium 32, a magnetic head 34 for recording and reproducing magnetic signals with respect to the magnetic recording medium 32, a head actuator 35 that has a suspension on the distal end of which the magnetic head 34 is mounted, and supports the magnetic head 34 such that it freely moves with respect to the perpendicular magnetic recording medium 32, a rotating shaft 36 for rotatably supporting the head actuator 35, a voice coil motor 37 for rotating and positioning the head actuator 35 via the rotating shaft 36, and a head amplifier circuit 38. The magnetic head 34 is a so-called composite head formed on an almost rectangular slider (not shown), and includes a write head having a single-pole structure, a read head using a GMR film or TMR film, and an MR (MagnetoResistive) head for recording/reproduction.

EXAMPLE 1

Manufacture of Perpendicular Magnetic Recording Medium

A cleaned disk-like glass substrate (the outer diameter was 2.5 inches) was prepared as a nonmagnetic substrate. This glass substrate was placed in a deposition chamber of a magnetron sputtering apparatus (C-3010 available from Canon Anelva), and the deposition chamber was evacuated to an ultimate vacuum degree of $4 \times 10^{-5}$ Pa or less. After that, DC magnetron sputtering was performed as follows in an Ar ambient at a gas pressure of about 0.6 Pa unless otherwise specified.

First, a 30-nm-thick CoZrNb alloy, 0.7-nm-thick Ru, and a 30-nm-thick CoZrNb alloy were sequentially formed as a soft magnetic backing layer on the nonmagnetic substrate. Note that the two CoZrNb layers antiferromagnetically coupled with each other by Ru formed between them.

Then, an 8-nm-thick Pd layer was formed on the CoZrNb layer.

Subsequently, a 10-nm-thick Ru layer was formed. Note that after the deposition of the Ru layer, it is also possible to raise the Ar gas pressure to 6 Pa and further stack a 10-nm-thick Ru layer.

In addition, a 5-nm-thick Ti layer was stacked to form a nonmagnetic underlayer having a total thickness of 23 nm.

After that, the Ar gas pressure was raised to 3 Pa, and a multilayered magnetic recording layer was deposited by the following procedure.

First, Ag equivalent to a thickness of 0, 0.2, 0.4, or 0.6 nm was sputtered.

Then, a 0.8-nm-thick Pt layer was deposited, and a 0.4-nm-thick Co layer was deposited. Separately, Ag equivalent to a thickness of 0.2 or 0.4 nm was sputtered at the same time the Co layer was deposited, thereby manufacturing a medium in which the magnetic layer was Co-25 at % Ag or Co-40 at % Ag (a designed value).

After the procedure as described above was repeated eight times, a 0.8-nm-thick Pt layer was further stacked on the last Co layer, thereby forming a multilayered magnetic recording layer.

The multilayered magnetic recording layer thus obtained will be represented by [Ag/Pt/Co]8, [Ag/Pt/Co-25 at % Ag]8, or [Ag/Pt/Co-40 at % Ag]8 hereinafter. In the obtained perpendicular magnetic recording medium, the layers were stacked in the order of the substrate/soft magnetic backing layer/Pd (8 nm)/Ru (10 nm)/Ti (5 nm)/multilayered magnetic recording layer.

Subsequently, a 6-nm-thick C protective layer was stacked on the multilayered magnetic recording layer.

After the protective layer was stacked as described above, the medium was removed from the deposition chamber, and a 1.5-nm-thick lubricating layer made of perfluoropolyether was formed on the protective layer by dipping, thereby obtaining a perpendicular magnetic recording medium. The obtained perpendicular magnetic recording medium had the same structure as that shown in FIG. 1 except that the lubrication layer is not shown.

Figure 5:
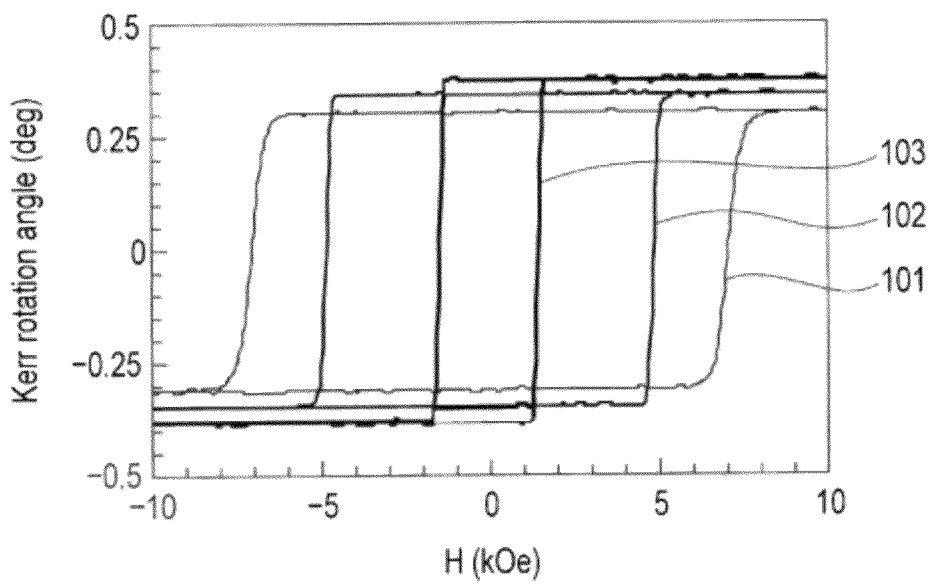
FIG. 5 shows magnetization curves obtained for the perpendicular magnetic recording medium according to the embodiment by a polar Kerr effect evaluation apparatus.

FIG. 5 shows an example of the effect of raising the Ar gas pressure when depositing the multilayered magnetic recording layer as [Ag/Pt/Co]8.

That is, FIG. 5 shows the measurement results of magnetization curves obtained for the medium after the deposition by a polar Kerr effect evaluation apparatus.

In FIG. 5, reference numeral 101 denotes a magnetization curve when the Ar gas pressure during the deposition was 5 Pa; 102, a magnetization curve when the Ar gas pressure during the deposition was 3 Pa; and 103, a magnetization curve when the Ar gas pressure during the deposition was 0.7 Pa.

FIG. 5 reveals that Hc increased as the Ar gas pressure was raised. This is so presumably because slight gaps were formed between the grains of Co as a polycrystal, and exchange coupling was weakened in the grain boundary, thereby making domain wall motion difficult. This is equivalent to weakening the exchange stiffness constant A described previously, so the formation of thin domain walls near the grain boundary can be expected.

When the Ar gas pressures were 0.7, 3, and 5 Pa, the gradients α of the magnetization curves near Hc were respectively 24, 23, and 8 (when the volume of only the magnetic layers was used in the calculation of Ms; the gradients α were respectively 97, 91, and 32 when the volume of the whole multilayered magnetic recording layer was used). When the Ar gas pressure was raised to 5 Pa, the gradient α obviously decreased but was still much larger than 5. This indicates that intergranular coupling was not weakened unlike in the granular medium, and domain wall motion type magnetization reversal occurred. In the above-mentioned example, an Ar gas pressure of 3 Pa at which Hc appropriately increased while the gradient of the Kerr loop was sufficiently large was adopted.

Figure 6:
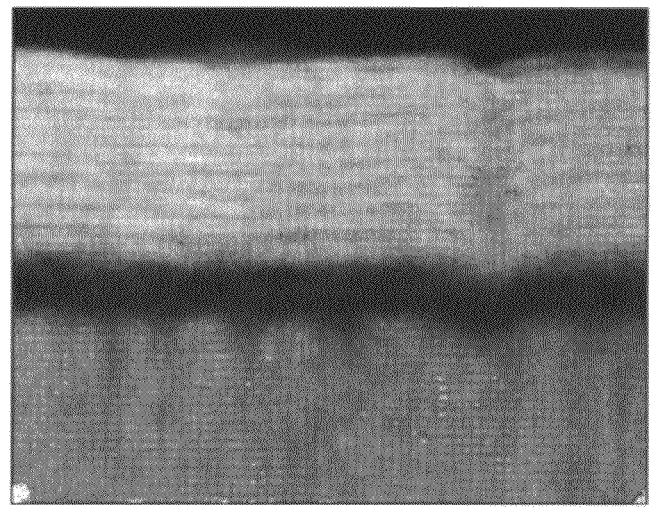
FIG. 6 is a scanning transmission electron micrograph showing the section of the perpendicular magnetic recording medium according to the embodiment.

FIG. 6 shows a dark-field image (DF-STEM image) obtained by a scanning transmission electron microscope for the sectional structure when the multilayered magnetic recording layer was [Ag(0.4)/Pt/Co-25 at % Ag]8. A numerical value in parentheses is the thickness, and the unit is (nm). In the DF-STEM image, an atom having a smaller mean atomic number looks blackish, and an atom having a larger mean atomic number looks whitish. FIG. 6 shows that the multilayered structure including the Co layers looking blackish and the Pt layers looking whitish was formed. Since Co—Pt is an all proportional solid solution system, both Pt on the Co layer and Co on the Pt layer readily grow to cover the surface without forming any islands, so a continuous layer was probably formed in the film surface (even if a compositionally modulated layer structure was formed by diffusion). Referring to FIG. 5, when deposition was performed at a low pressure, Hc became very small, the domain walls smoothly moved, and almost no pinning occurred. Accordingly, the Co layers and hence the Pt layers presumably formed continuous layers.

The magnetic characteristics of the obtained perpendicular magnetic recording medium were measured by using a polar Kerr effect evaluation apparatus (available from Neoark), a vibrating sample magnetometer (VSM, available from Riken Denshi), and a torque magnetometer (available from Toei Industries).

The polar Kerr effect evaluation apparatus can measure the magnetization curve of a magnetic recording layer on the surface side of a perpendicular magnetic recording medium (including a soft magnetic backing layer), but cannot measure the saturation magnetization Ms of the magnetic recording layer. When a soft magnetic backing layer is formed, the VSM or torque magnetometer also measures a perpendicular magnetic recording medium together with the soft magnetic backing layer, and cannot well separately evaluate them. When measuring Ms with the VSM and Ku with the torque magnetometer, therefore, a sample was used in which no soft magnetic backing layer was deposited and an NiTa layer having almost no magnetism and capable of obtaining almost the same magnetization curve was formed instead.

In the following description, each magnetization curve was measured in the direction perpendicular to the film surface, and a standard sweep time when measuring a major loop was 45 sec for the polar Kerr effect evaluation apparatus, and 3 min for the VSM.

Figure 7:
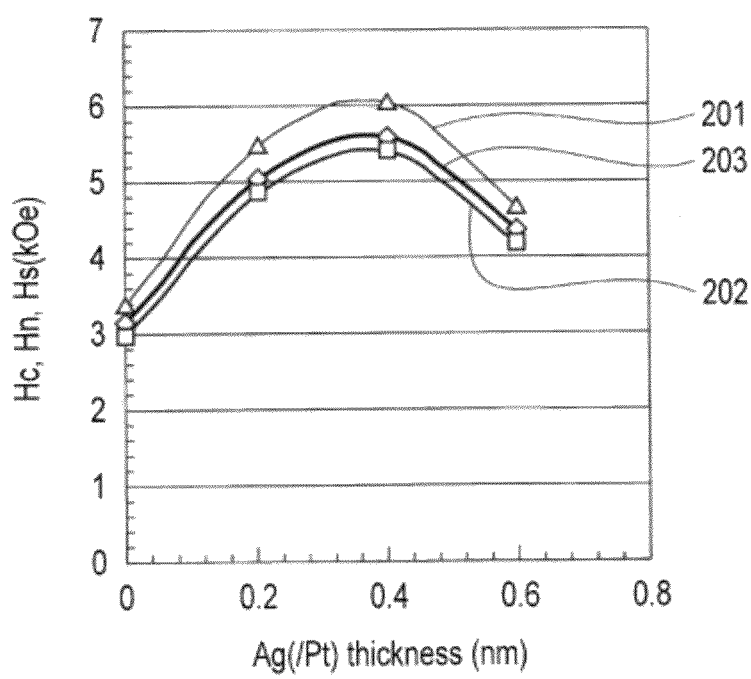
FIG. 7 is a graph showing the relationship between the Ag layer thickness and Hc, Hn, and Hs of an example of the perpendicular magnetic recording medium according to the embodiment.

FIG. 7 shows the dependence of the coercive force Hc, nucleation magnetic field Hn, and saturation magnetic field Hs on the Ag layer thickness, and FIG. 8 shows the dependence of the magnetic anisotropic constant Ku, anisotropic magnetic field Hk, and saturation magnetization Ms on the Ag layer thickness, when the multilayered magnetic recording layer [Ag/Pt/Co]8 was deposited at an Ar gas pressure of 3 Pa.

In FIG. 7, reference numerals 201, 202, and 203 respectively denote Hs, Hn, and Hc.

In FIG. 8, reference numerals 301, 302, and 303 respectively denote Ms, Hk, and Ku.

While Ku did not greatly change and Hk changed by only about 20% in FIG. 8, Hc increased by about 80% in FIG. 7. The increase in Hc much larger than that in Hk means that something that suppressed the motion of the domain walls was formed in the superlattice, so pinning sites were probably successfully formed. Also, a high Ku of 2.5 to $3 \times 10^7$ erg/cc was obtained. Since a high Ar gas pressure was adopted as described above, thin domain walls were presumably formed. Thin domain walls help narrow the transition region between bits, and also effectively increase the thermal stability because the pinning energy rises for the same pinning site diameter. Since the value of Ku was an order of magnitude higher than that of a normal CoCrPt-oxide-based granular medium, Ms was high, but Hk was 40 to 50 kOe that was about three times that of a normal granular medium. In the granular medium with very high Hk, Hc greatly increased accordingly and became a large value by which recording was impossible (without assist such as heat). In the domain wall motion type medium of this embodiment, however, Hc was suppressed to about 5 kOe equivalent to that of the existing granular medium. Accordingly, when a multilayered film including pinning sites in a magnetic recording layer is used as an unpatterned continuous medium having a flat surface and capable of well flying a head, it is possible to provide a perpendicular magnetic recording medium capable of achieving both a high thermal stability and high recording easiness and obtaining a high areal recording density, and a magnetic recording/reproduction apparatus using the medium.

Note that when the Ag layer thicknesses were 0, 0.2, 0.4, and 0.6 nm, the gradients α of the magnetization curves near Hc were respectively 29, 24, 18, and 17 (when the volume of only the magnetic layers was used in the calculation of Ms; the gradients α were respectively 87, 83, 72, and 78 when the volume of the whole multilayered magnetic recording layer was used).

Also, FIG. 9 shows the dependence of Hc, Hn, and Hs on the Ag layer thickness, and FIG. 10 shows the dependence of Ku, Hk, and Ms on the Ag layer thickness, when Ag was added to the Co layer, and the multilayered magnetic recording layer [Ag/Pt/Co-25 at % Ag]8 was deposited at an Ar gas pressure of 3 Pa.

In FIG. 9, reference numerals 401, 402, and 403 respectively denote Hc, Hn, and Hs.

In FIG. 10, reference numerals 501, 502, and 503 respectively denote Ku, Hk, and Ms.

Almost the same results were obtained except that Hc, Hn, and Hs decreased by about 1 kOe as a whole, and Ku and Hk decreased when the Ag layer thickness before Pt was small.

The formation of Ag pinning sites will be explained below. When a micro amount of Cu is deposited on a Ti underlayer, fine Cu islands can be formed at a high density. However, the same structure can be expected when using Ag instead of Cu. Pt is dissolved in both Ti and Ag to some extent. When depositing Pt on Ti/Ag, therefore, the film is presumably formed into a layer, instead of growth on the Ag islands. Since the Pt layer is thin, the Ag islands are desirably not entirely covered. When depositing Ag and Pt not simultaneously but sequentially, Ag and Pt are not dissolved on the atomic level, and the Ag concentration is probably high in at least positions where the Ag islands existed. When simultaneously depositing Co and Ag on this structure, Co can be perhaps stacked not in the periphery of Ag islands but on Pt, and Ag can be perhaps stacked on Ag of the first layer, because Co forms an all proportional solid solution with Pt but is insoluble in Ag. When one period is thus ended and Ag is deposited on the Co layer again, Ag probably can grow in the portion where Ag segregated, instead of the Co portion. Since Pt of the second layer is stacked not on Ti/Ag but on a portion where Co and Ag segregated, the Pt layer can be perhaps formed on Co more than when Ti is deposited. By thus repetitively depositing a small amount of Ag, Ag grows into columns in the [Pt/Co] superlattice by using the Ag islands formed on the Ti layer as nuclei. This presumably makes it possible to form Ag holes, i.e., pinning sites in the Co layer. Based on this presumption, deposition as described above was performed.

Note that the [Ag/Co] superlattice is an in-plane magnetization film because no large perpendicular anisotropy can be obtained. If Ag forms a layer or is in contact with Co over a broad range, it is probable that Ku greatly decreases and Hc decreases as well. Accordingly, Ag presumably forms a small mass from the viewpoint of magnetism as well.

Note also that even when Ag is not simultaneously deposited on the Co layer, the dependence on the Ag thickness as shown in FIG. 7 remained the same. This indicates that the same structure was formed without simultaneously depositing Ag. By contrast, if the amount of Ag is too large, the Ag island may form a projection or extend to a portion other than pinning sites. However, FIG. 6 shows no such phenomenon. In addition, if the structure breaks down, the magnetic characteristics probably worsen as well. Therefore, the ranges of the above-mentioned deposition conditions are appropriate.

<Recording/Reproduction Characteristics>

The recording/reproduction characteristics were evaluated by using the RH4160E spinstand available from Hitachi High-Technologies. Also, information was recorded and reproduced by using a perpendicular recording type composite head including a shielded pole type recording element in which the distal end of an auxiliary magnetic pole was formed to extend to the vicinity of a main magnetic pole, and a tunneling magnetoresistive (TMR) reproduction element. The width in the track direction of the main magnetic pole of the recording element was about 300 nm, and measurements were performed in a radial position of 26 mm at a rotational speed of 5,400 rpm. Note that the shielded pole type recording element was used in the present invention, but it is also possible to use the conventional single pole type recording element in which an auxiliary magnetic pole is spaced apart from a main magnetic pole. Note also that CoFeNi was used as the material of the recording magnetic pole, but it is also possible to use a material such as CoFe, CoFeN, NbFeNi, FeTaZr, or FeTaN. An additive element can further be added to any of these magnetic materials as a main component.

Figure 12:
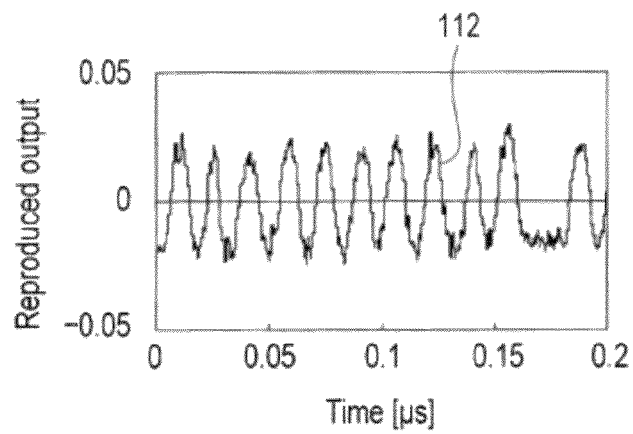
FIG. 12 is a graph showing the reproduced waveform of another example of the perpendicular magnetic recording medium according to the embodiment.
Figure 13:
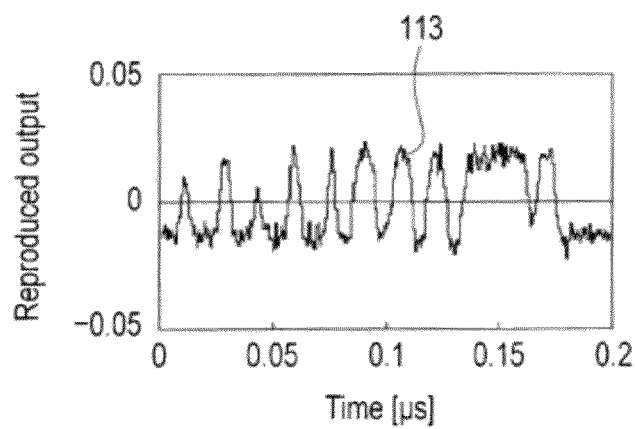
FIG. 13 is a graph showing the reproduced waveform of still another example of the perpendicular magnetic recording medium according to the embodiment.

FIG. 11 shows a reproduced waveform when recording was performed at a linear recording density of about 200 kFCI (Flux Change/Inch) on a perpendicular magnetic recording medium using a multilayered magnetic recording layer [Ag/Pt/Co]8 deposited at an Ar gas pressure of 3 Pa. Also, as comparative examples, FIG. 12 shows a reproduced waveform obtained in the same manner as in the example except that no Ag pinning sites were formed, FIG. 13 shows a reproduced waveform when the Ar gas pressures were 0.7 Pa, and FIG. 14 shows a reproduced waveform when the Ar gas pressure was 0.7 Pa and no Ag pinning sites were formed.

In FIGS. 11, 12, 13, and 14, reference numerals 111, 112, 113, and 114 denote the reproduced waveforms.

Figure 14:
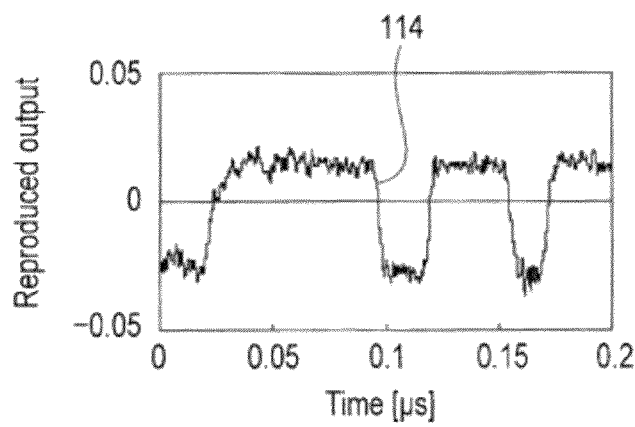
FIG. 14 is a graph showing the reproduced waveform of still another example of the perpendicular magnetic recording medium according to the embodiment.

FIG. 14 shows a [Pt/Co] superlattice in which no pinning was performed, and demonstrates that irregular magnetic domains were formed and no recording was possible at 200 kFCI. Referring to FIG. 13 in which Ag pinning sites were added to FIG. 14, a reproduced waveform partially corresponding to 200 kFCI was obtained although the waveform was insufficient. This reveals that the pinning effect was obtained by the addition of Ag. FIG. 12 shows a result obtained by raising the Ar gas pressure to 3 Pa when compared to FIG. 14. As shown in FIG. 12, recording was possible at about 200 kFCI except for some portions, because the domain walls were thinned by the weakening of intergranular coupling and the pinning effect between the grains was obtained. FIG. 11 shows a result when Ag pinning sites were further added, and indicates that it was possible to reproduce good waveform by combining the pinning effect with the effect of raising the gas pressure.

When the Ar gas pressure was raised to 5 Pa in the deposition of the multilayered magnetic recording layer, no big difference was found in the reproduced waveform. When the Ar gas pressure was raised to 7 Pa, however, noise increased, and the reproduced output decreased. When the Ar gas pressure was 7 Pa, the gradient of the magnetization curve was smaller than that when the Ar gas pressure was 5 Pa, and a was 4. Since magnetic coupling between the grains was weakened and the magnetization reversal mode changed from domain wall motion and became close to magnetization rotation of each grain, a reversed domain was presumably readily formed in a recording track saturation region. Accordingly, a magnetization curve gradient α of 4 or less can be probably in the magnetic recording medium of the present invention.

Figure 15:
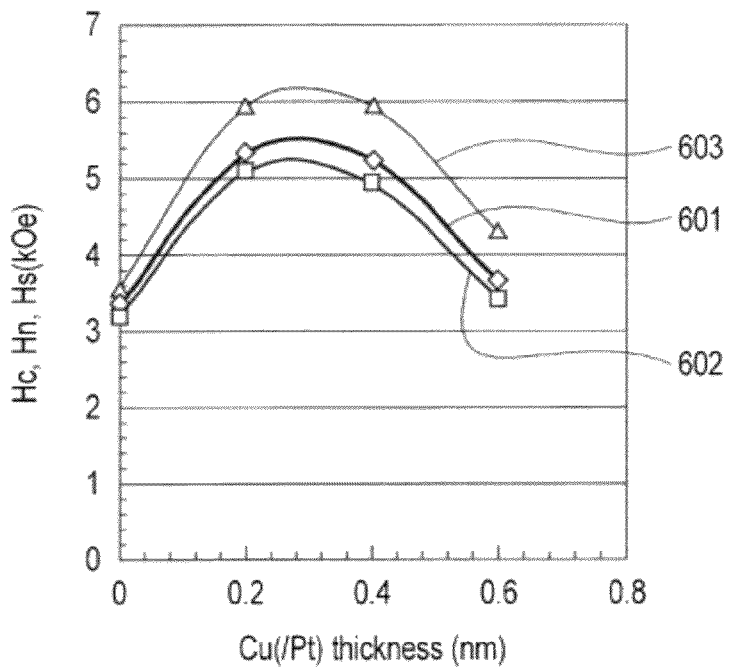
FIG. 15 is a graph showing the relationship between the Cu layer thickness and Hc, Hn, and Hs of an example of the perpendicular magnetic recording medium according to the embodiment.
Figure 16:
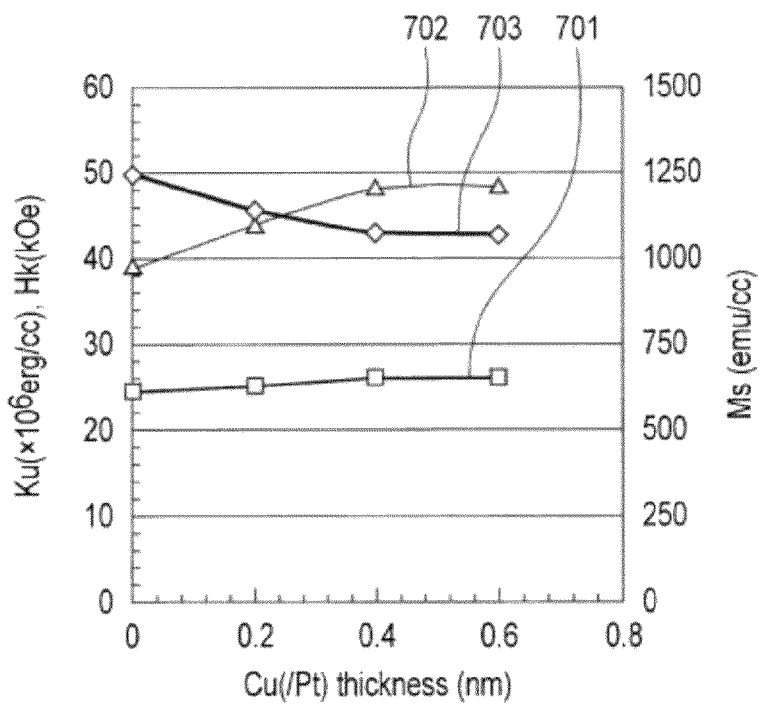
FIG. 16 is a graph showing the relationship between the Cu layer thickness and Ku, Hk, and Ms of the example of the perpendicular magnetic recording medium according to the embodiment.

FIG. 15 shows the dependence of Hc, Hn, and Hs on the Cu layer thickness, and FIG. 16 shows the dependence of Ku, Hk, and Ms on the Cu layer thickness, when a perpendicular magnetic recording medium was manufactured following the same procedures as in the above-mentioned example except that the pinning sites were changed to Cu, and the multilayered magnetic recording layer [Cu/Pt/Co]8 was deposited at an Ar gas pressure of 3 Pa.

In FIG. 15, reference numerals 601, 602, and 603 respectively denote Hc, Hn, and Hs.

In FIG. 16, reference numerals 701, 702, and 703 respectively denote Ku, Hk, and Ms.

As shown in FIGS. 15 and 16, almost the same results were obtained, e.g., Hc increased as the Cu layer thickness increased and the increase in Hc was much larger than that in Hk, except that Ku was low and Ms more or less decreased.

Note that when using Cu as the pinning sites, a micro amount of Cu was deposited on the Ti underlayer, so fine Cu islands were obtained at a high density as the first layer (as the nuclei of pinning sites) as described previously (not as expectation like that for Ag). The formation of Cu pinning sites after that can be regarded as that of Ag. In practice, the dependence of Hc and Hk on the Cu layer thickness was almost the same as that of Hc and Hk on the Ag layer thickness. Therefore, it is presumable that the Ag islands on Ti grew in almost the same manner as the Cu islands.

Furthermore, similar results were obtained when the pinning sites were changed to Au.

Similar results were obtained when manufacturing a perpendicular magnetic recording medium following the same procedures as in the above-mentioned example except that the nonmagnetic layer was changed to Pd.

The nonmagnetic layer was changed to Ni based on the assumption that columnar pinning sites are easier to form and the pinning effect is easier to obtain if the pinning sites are insoluble in the nonmagnetic layer as well. However, no effect of increasing Hc with respect to the Ag amount was found. Although the structure was not confirmed, even when it was possible to form pinning sites having a diameter equivalent to that of the above-mentioned embodiment, Ku obtained by the [Co/Ni] superlattice was not so high as those obtained by the [Co/Pt] and [Co/Pd] superlattices. This probably formed thick domain walls and made pinning difficult.

In the above-mentioned example, the Ti underlayer was used to control the distribution of pinning sites. Therefore, based on the assumption that it may be possible to form fine noncolumnar pinning sites at a high density by arranging Ti in each layer in the superlattice, the present inventors tried a [Ti/Ag/Co/Pt] superlattice as well. However, the [Ti/Co] superlattice is an in-plane film from which almost no Ku can be obtained. Accordingly, although a perpendicular magnetization film was formed even by using the [Ti/Co/Pt] superlattice in which the upper half was Pt, Hc was small, and it was impossible to obtain a sufficient Ku. Consequently, it was impossible to confirm the pinning effect by the Ag islands on Ti. However, this probably does not essentially mean that noncolumnar pinning sites formed in the magnetic layer portion alone are insufficient.

When the multilayered magnetic recording layer was formed on Ru without forming any Ti underlayer immediately below the multilayered magnetic recording layer, Hc decreased with respect to the Ag amount, and no pinning effect was obtained. This is so perhaps because no islands allowing easy occurrence of pinning were formed when Ag was deposited on Ru for the first time, because Ag is insoluble in Ru.

When perpendicular magnetic recording media were manufactured following the same procedures as in the above-mentioned example except that the Ti underlayer was changed to Pt and Al, the change in Hc with respect to the Ag amount was almost flat. Although no sufficient pinning effect was obtained because Hc did not increase, the layered structure of the superlattice was not broken because Hc did not decrease either. That is, Ag presumably formed a mass like a pinning site. If pinning is insufficient because the pinning site diameter is smaller than the domain wall thickness, it may be possible to achieve the pinning effect by raising Ku by some method. Therefore, it is probable that the Pt and Al underlayers are also promising.

EXAMPLE 2

Micromagnetics Simulation

To check 3 Tbits/inch$^2$-class bit recording and stability, micromagnetics simulation was performed by using commercially available software "LLG Micromagnetics Simulator (M. R. Sheinfein et al.)" The size of a calculation model was 32×32×8 nm, and this calculation model was divided into cubic cells of 1 nm/side. Since the periodic boundary condition was applied in the in-plane direction, the same demagnetizing field as that for an infinitely wide film surface was practically obtained. The size of a grain in the plane was based on a square of 4 nm/side, and pinning sites were demagnetized for every other grain.

FIG. 17 is a plan view of a micromagnetics simulation calculation model of an example of the perpendicular magnetic recording medium according to the embodiment.

Assume that reference numeral 21 denotes pinning sites, and reference numeral 22 denotes other portions, i.e., magnetic grains of 4 nm/side. The interior of each magnetic grain 22 was divided into cubic cells of 1 nm/side (not shown), the exchange stiffness constant was A=0.5 or 1 μerg/cm between the cells (inside the magnetic grain), and A=0.5 μerg/cm between the grains. Ms=1000 emu/cc, and Δθ50=5° was set by giving dispersion to only the easy axis of magnetization. A Gilbert damping constant α was 1, and the temperature was set at 300 K by taking account of the thermal decay. A head magnetic field was applied for 0.1 ns to a 20×10-nm rectangular region 23 represented by the dotted lines in the center of the model, and the magnetization state was calculated 0.1 ns after the head magnetization was eliminated.

Figure 18:
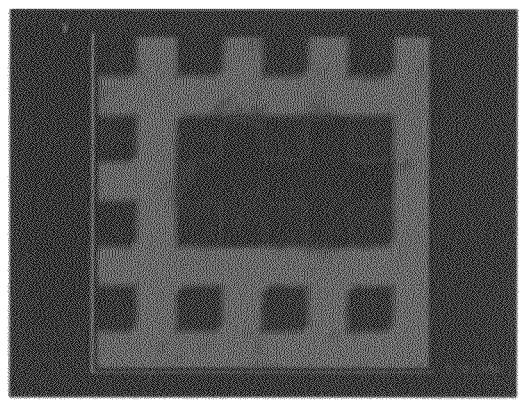
FIG. 18 is a photograph showing an image representing an example of a micromagnetics simulation calculation model in the in-plane direction of an example of the perpendicular magnetic recording medium according to the first embodiment.

FIG. 18 is a photograph of an image representing a micromagnetics simulation calculation model in the in-plane direction of a perpendicular magnetic recording medium according to the first embodiment including columnar pinning sites.

FIG. 18 shows calculation results when A=1 μerg/cm between the cells, A=0.5 μerg/cm between the grains, and Ku=4×10$^7$ erg/cc.

Black portions represent the pinning sites, red portions represent magnetic grains exhibiting upward spins, and blue portions represent magnetic grains exhibiting downward spins.

Although the magnitude of A depends on the cell size, 1 μerg/cm often used for Co-based materials was adopted. Since the magnitude of A between the grains is half, this is experimentally equivalent to weakening intergranular coupling by raising the Ar gas pressure, thereby increasing Hc. Although the position of the domain was shifted from the recording position to a position where the domain was readily fixed by the pinning site, rectangular domains were stably formed. The domain size was 20×12 nm, i.e., slightly increased. However, when Ku=4×10$^7$ erg/cc and pinning sites about 4 nm in diameter were arrayed at a areal density of about 25%, it was possible to stably hold 3 Tbits/inch$^2$-class bits even at room temperature. Accordingly, it is possible, by using a continuous film including pinning sites in the magnetic recording layer, to provide a perpendicular magnetic recording medium having both a high areal recording density and high thermal stability, and a magnetic recording/reproduction apparatus using the medium.

Figure 19:
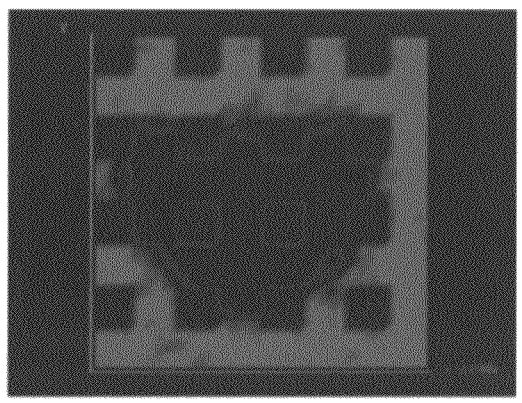
FIG. 19 is a photograph showing an image representing an example of a micromagnetics simulation calculation model in the in-plane direction of another example of the perpendicular magnetic recording medium according to the first embodiment.

FIG. 19 is a photograph of an image representing another example of the micromagnetics simulation calculation model in the in-plane direction of the example of the perpendicular magnetic recording medium according to the first embodiment including columnar pinning sites.

FIG. 19 shows calculation results when A=0.5 μerg/cm between the cells and between the grains, and Ku=3×10$^7$ erg/cc. Since it was probable, by comparing some experiments with calculations, that a result close to an experiment was obtained by decreasing A inside the grain to about 0.5 μerg/cm, calculations were also performed when A=0.5 μerg/cm. Although it is known that domains are stable when A between grains is smaller than that inside a grain, calculations were performed under severe conditions by which intergranular coupling was sufficiently strong (a magnetically uniform continuous film was formed). When the domain periphery was compared with that shown in FIG. 18, the domain walls did not stop at the grain boundary and blurred the boundary. However, the domains did not shrink with time but were stably held. The areal recording density did not reach 3 Tbits/inch$^2$ because the domain size slightly increased. However, it was possible to stably hold micro bits even at room temperature under the severe conditions by which intergranular coupling was not weakened. This makes it possible, by using a continuous film including pinning sites in the magnetic recording layer, to provide a perpendicular magnetic recording medium having both a high areal recording density and high thermal stability, and a magnetic recording/reproduction apparatus using the medium.

Then, calculations were performed when an 8-nm-thick layer was divided into two 4-nm-thick layers, and the positions of pinning sites in the upper and lower layers were made different.

FIG. 20 is a perspective view of a micromagnetics simulation calculation model of an example of a perpendicular magnetic recording medium according to the second embodiment.

Note that each arrow represents the magnetic moment in the center of each cell.

Figure 21:
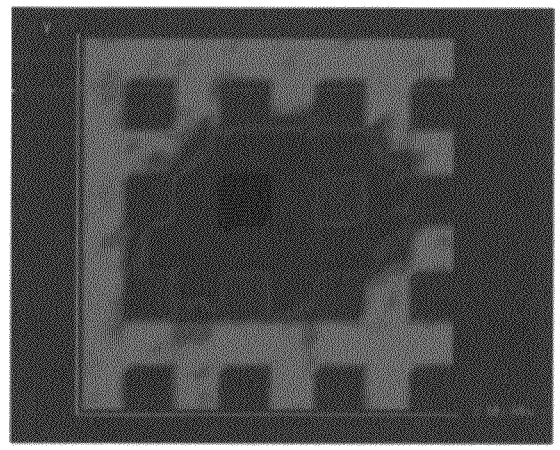
FIG. 21 is a photograph showing an image representing an example of a micromagnetics simulation calculation model in the in-plane direction of the example of the perpendicular magnetic recording medium according to the second embodiment.

FIG. 21 is a photograph of an image representing an example of a micromagnetics simulation calculation model of the upper layer shown in FIG. 20.

Figure 22:
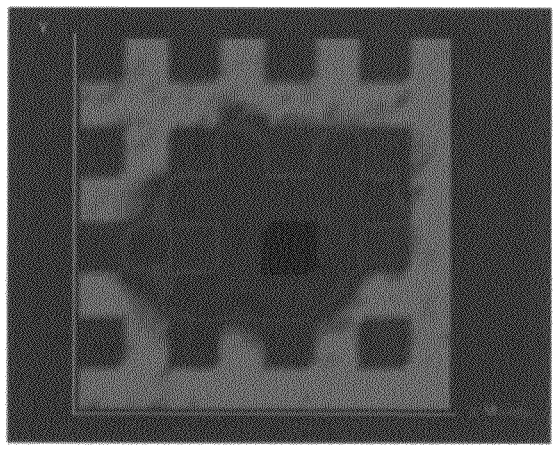
FIG. 22 is a photograph showing an image representing an example of a micromagnetics simulation calculation model in the in-plane direction of the example of the perpendicular magnetic recording medium according to the second embodiment.

FIG. 22 is a photograph of an image representing an example of a micromagnetics simulation calculation model of the lower layer shown in FIG. 20.

The conditions were basically the same as those of FIG. 19, i.e., A=0.5 μerg/cm between the cells and between the grains, and Ku=3×10$^7$ erg/cc. However, exchange coupling between the upper and lower layers was weakened to 0.2 μerg/cm. These calculation conditions are based on the assumption that in a multilayered magnetic recording layer, magnetic layers sandwich a nonmagnetic layer and weakly couple with each other, and pinning sites are not columnar but three-dimensionally scattered.

FIG. 21 shows domains in a 4- to 5-nm-thick layer immediately above the interface. FIG. 22 shows domains in a 3- to 4-nm-thick layer immediately below the interface. Although the positions of pinning sites in the upper and lower layers were different, the positions of domains overlapped each other. Since the domain positions in the upper and lower layers were different when there was no interlayer coupling, the introduction of interlayer coupling was effective. Also, there was the apprehension that the pinning force might be weakened when the each magnetic layer thickness was decreased, but the width of the transition region did not increase as is apparent from comparison with FIG. 19.

Furthermore, in the domain boundaries shown in FIGS. 21 and 22, the domain did not particularly expand in a portion where a film existed above or below one pinning site. Therefore, even when pinning sites are formed in only a magnetic layer, the domain walls may extend above and below the pinning sites, and this includes the diffusion of Co into a Pt layer. Accordingly, even when pinning sites are not formed in nonmagnetic layers and do not extend in the form of a column through magnetic layers as shown in FIG. 2, it is possible to provide a perpendicular magnetic recording medium having both a high areal recording density and high thermal stability, and a magnetic recording/reproduction apparatus using the medium.

In each embodiment, a multilayered film including pinning sites in a magnetic recording layer is used as an unpatterned continuous medium having a flat surface and capable of well flying a head. This makes it possible to provide a perpendicular magnetic recording medium having both a high areal recording density and high thermal stability, and a magnetic recording/reproduction apparatus using the medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A perpendicular magnetic recording medium comprising:
   a substrate; and
   a multilayered magnetic recording layer formed on the substrate by alternately stacking not less than two magnetic layers and not less than two nonmagnetic layers,
   wherein the magnetic layers are each magnetically continuous in an in-plane direction and magnetically coupled with each other,
   each of the magnetic layers from a bottom of the multilayered magnetic recording layer to a top of the multilayered magnetic recording layer in a thickness direction thereof, includes a magnetic material portion and a plurality of pinning portions, which are capable of pinning magnetic domain walls and dispersed within the magnetic material portion, the pinning portions being metallic and made of a nonmagnetic metal element different from an element that is a main component of the nonmagnetic layer, and
   a magnetic characteristic of the medium is such that a gradient α of a magnetization curve near a coercive force is not less than 5.

2. The medium of claim 1, wherein the magnetic layer includes crystalline magnetic grains mainly containing cobalt.

3. The medium of claim 1, wherein the nonmagnetic layer mainly contains one of platinum and palladium.

4. The medium of claim 1, wherein the pinning portion contains, as a main component, at least one element selected from the group consisting of copper, silver, and gold.

5. The medium of claim 1, further comprising, between the multilayered magnetic recording layer and the substrate, a nonmagnetic underlayer mainly containing at least one metal selected from the group consisting of titanium, platinum, and aluminum, wherein the multilayered magnetic recording layer is formed in contact with the nonmagnetic underlayer.

6. The medium of claim 5, wherein the nonmagnetic underlayer mainly contains titanium.

7. The medium of claim 1, wherein the nonmagnetic layer includes a nonmagnetic material portion and a plurality of pinning portions dispersed within the nonmagnetic material portion and made of the nonmagnetic metal different from the nonmagnetic material, and the pinning portions in the nonmagnetic layer are connected to the pinning portions in an adjacent magnetic layer to form the columns.

8. The medium of claim 1, wherein the pinning portions are made of metal that is insoluble in the magnetic material portion.

9. A magnetic recording/reproduction apparatus comprising:
a perpendicular magnetic recording medium comprising a substrate, and a multilayered magnetic recording layer formed on the substrate by alternately stacking not less than two magnetic layers and not less than two nonmagnetic layers,
wherein the magnetic layers are each magnetically continuous in an in-plane direction and magnetically coupled with each other,
each of the magnetic layers from a bottom of the multilayered magnetic recording layer to a top of the multilayered magnetic recording layer in a thickness direction thereof, includes a magnetic material portion and a plurality of pinning portions, which are capable of pinning magnetic domain walls and dispersed within the magnetic material portion, the pinning portions being metallic and made of a nonmagnetic metal element different from an element that is a main component of the nonmagnetic layer, and
a magnetic characteristic of the medium is such that a gradient α of a magnetization curve near a coercive force is not less than 5; and
a write head having a single-pole structure.

10. The apparatus of claim 9, wherein the magnetic layer includes crystalline magnetic grains mainly containing cobalt.

11. The apparatus of claim 9, wherein the nonmagnetic layer mainly contains one of platinum and palladium.

12. The apparatus of claim 9, wherein the pinning portion contains, as a main component, at least one element selected from the group consisting of copper, silver, and gold.

13. The apparatus of claim 9, further comprising, between the multilayered magnetic recording layer and the substrate, a nonmagnetic underlayer mainly containing at least one metal selected from the group consisting of titanium, platinum, and aluminum, wherein the multilayered magnetic recording layer is formed in contact with the nonmagnetic underlayer.

14. The apparatus of claim 13, wherein the nonmagnetic underlayer mainly contains titanium.

15. The apparatus of claim 9, wherein the nonmagnetic layer includes a nonmagnetic material portion and a plurality of pinning portions dispersed within the nonmagnetic material portion and made of the nonmagnetic metal different from the nonmagnetic material, and the pinning portions in the nonmagnetic layer connect to the pinning portions in an adjacent magnetic layer to form the columns.

16. The apparatus of claim 9, wherein the pinning portions are made of metal that is insoluble in the magnetic material portion.

* * * * *